United States Patent
Kancler et al.

[19]

[11] Patent Number: 5,838,813
[45] Date of Patent: Nov. 17, 1998

[54] DITHERED IMAGE RECONSTRUCTION

[75] Inventors: Henry C. Kancler, Los Altos Hills; James D. Roberts, San Jose, both of Calif.

[73] Assignee: Lockheed Martin Corp., Sunnyvale, Calif.

[21] Appl. No.: 770,493

[22] Filed: Dec. 20, 1996

[51] Int. Cl.⁶ .......................... G06K 9/20; H04N 1/195
[52] U.S. Cl. ................ 382/103; 382/270; 382/312; 358/406; 358/466; 358/474; 250/208.1
[58] Field of Search ................ 382/270, 312, 382/103, 275, 274; 358/406, 471, 474, 494, 504, 505, 446, 461, 463; 348/169; 250/208.1, 214 AG

[56] References Cited

U.S. PATENT DOCUMENTS 5,514,865  5/1996  O'Neil ......................... 250/208.1

OTHER PUBLICATIONS

"Image Dithered Non–Uniformity Estimation and Correction", Robert D. Frey, Jr., LORAL Infrared and Imaging Systems, Mar. 1995.

*Primary Examiner*—Scott Rogers
*Attorney, Agent, or Firm*—Feix & Feix

[57] ABSTRACT

A dithered image reconstruction system and method that compensates for inter-detector errors in a manner that does not adversely affect detection of small-amplitude images in the presence of a very bright large-amplitude background. An overlapping dither pattern is employed in a detector array (103), and outputs generated by individual detectors (302) are adjusted in an iterative fashion to hold all outputs for a particular detector substantially constant, while allowing each set of outputs for each image section to converge on a solution. The system and method do not substantially distort the received signal, nor do they fail when the image characteristics have little spatial variation, such as when a large target area is being detected.

18 Claims, 13 Drawing Sheets

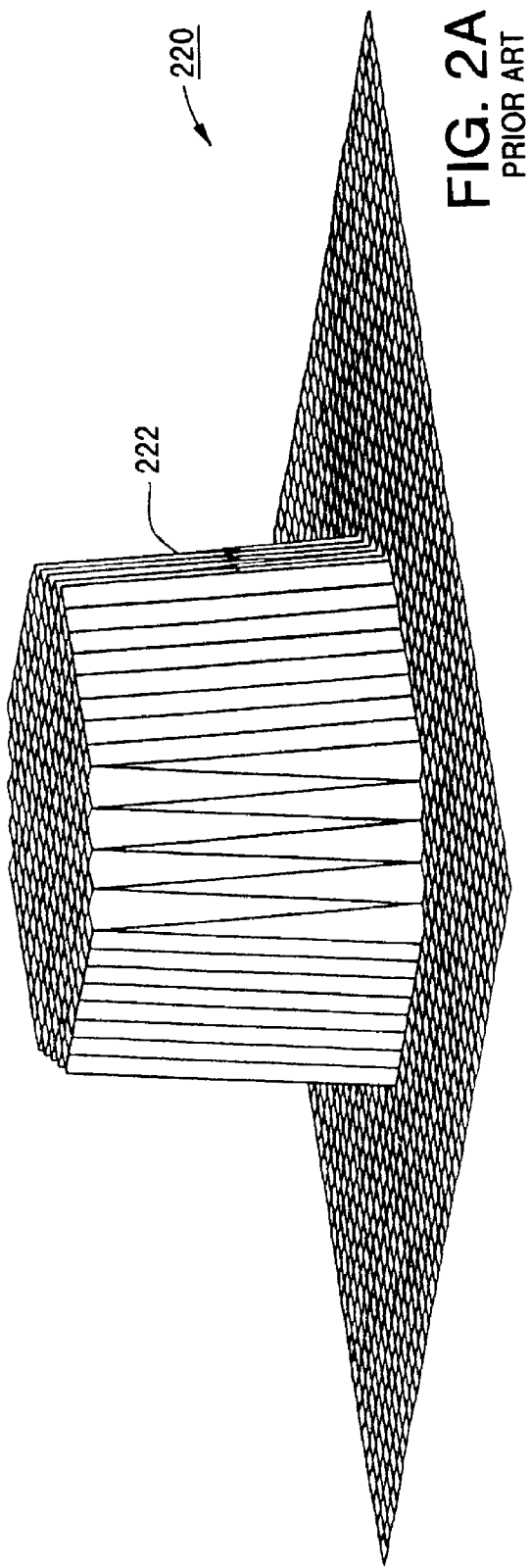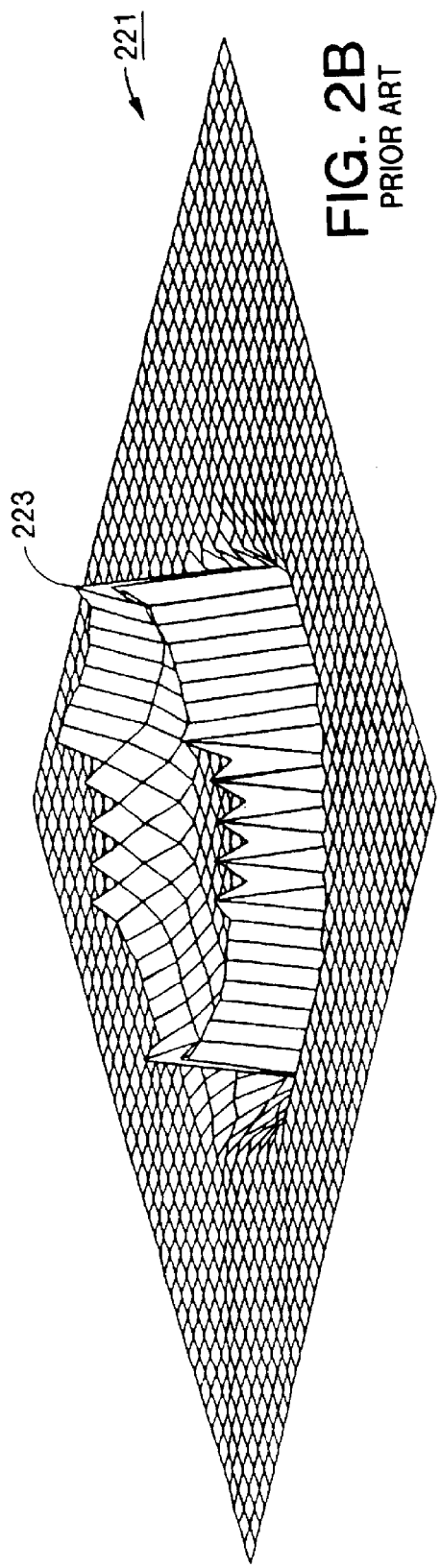

DITHERED IMAGE RECONSTRUCTION

BACKGROUND OF THE INVENTION

1. Field of the Invention

This invention relates to reconstruction of dithered images and, more particularly, to an improved system and method of detecting and reconstructing an image from a detector array in the presence of inter-detector error and/or a very bright large-amplitude background.

2. Description of Background Art

Two-dimensional detector arrays have been developed for sensing of images in both visible and non-visible spectra. Differences in detection characteristics, for example gain variations, among individual detectors of such arrays can diminish the accuracy of the array output. Such differences may result from calibration error, normal variation in manufacturing, positioning error, or other factors. In particular, detection of small-amplitude images in the presence of relatively bright large-amplitude backgrounds is problematic. Due to the specific gain characteristics of typical array detectors, this problem is often exacerbated when inter-detector error is present.

Calibration of detectors can reduce inter-detector error and improve reconstruction of images. For example, responses of individual detectors can be determined using a calibration signal, and compensating error correction tables constructed, which can later be referenced when detecting images. However, even with extensive calibration, a significant amount of error may remain. Detector error may vary with temperature, time, or other characteristics not taken into account by the error correction tables. Although calibration may reduce error somewhat, in some applications, such as detection of small-amplitude images in the presence of relatively bright large-amplitude backgrounds, such calibration fails to sufficiently improve reconstruction capability.

An example of such application is the detection and tracking of a missile target. A very large background signal may obscure the target signal.

Prior methods of detection in large-amplitude employ time-domain techniques such as digital filters and Fourier transforms. Such techniques introduce distortion into the received signal.

U.S. Pat. No. 5,514,865 for "Dither Image Scanner with Compensation for Individual Detector Response and Gain Correction", issued on May 7, 1996 toW. F. O'Neill, describes dithering, a frequently-employed technique used to aid detection by correcting gain and offset errors. As described in O'Neill, dithering involves moving array detectors in a periodic fashion. The dither pattern allows for detector overlap and common scan paths, so that gain and offset errors in the output signals from the individual detectors can be corrected based on signals resulting from the detector overlap and common scan paths. Each section of the image space is read by a plurality of detectors, so that the output from the various detectors can be combined to generate a final output.

The dithering technique uses only the differential of the signals between two adjacent detectors to provide gain and offset correction adjustments. The technique does not perform well for scenes of varying brightness or rapidly moving objects. The preferred compensation for this weakness as disclosed in O'Neill has the effect of not applying the algorithm to rapidly changing regions of the image. As a result, moving targets may not be sufficiently resolved by the technique of O'Neill.

Although dithering aids in correcting inter-detector errors, it does not solve the problem of detection in large-amplitude background situations. One known technique of addressing this problem involves the application of active offset compensation (AOC) to a dithered image pattern, as described by R. D. Frey, Jr., "Image Dithered Non-Uniformity Estimation and Correction", March 1995. Frey presents an active offset compensation technique involving application of a high-pass filter to individual detector outputs. A separate filter is maintained for every physical pixel in the focal plane, in order to reduce low frequency and constant portions of detector temporal output. Spatial variations in the object space image result in temporal variations in the detector output, due to dithering. These variations are passed through the temporal high-pass filter. Thus, edge detection of target signals is facilitated, and the effect of background noise reduced.

However, AOC causes regions in the object space image having little spatial variation over the spatial extent of the dither sequence to be significantly attenuated as they cause minimal temporal variation in the detector outputs processed through the high pass filters. Thus, if the target occupies a large area, and has little spatial variation in image characteristics within the large area, the final output will fail to depict a significant central portion of the target. This is particularly problematic in the application discussed previously, as when a missile approaches its target, the apparent size of the target increases significantly, so that it occupies a large area in the detector array. In such an application, AOC may cause distortion in the signal, resulting in misidentification of the target. A tumbling target may also result in some portions of the target image being accentuated and other portions attenuated, making identification and tracking more difficult.

An inverse Fast Fourier Transform (FFT) technique may be employed to improve detection of such large areas when using AOC. However, it has been found that such a technique produces imperfect results. For example, in addition to the low frequency information that may be lost due to application of AOC, target dynamics may be imperfectly compensated, particularly when the inverse transform is not performed at the sample rate of the sensor.

What is needed is a system and method of compensating for inter-detector errors in a manner that does not adversely affect detection of small-amplitude images in the presence of a very bright large-amplitude background, and further does not substantially distort the received signal, and further does not fail when the image characteristics have little spatial variation, such as when a large target area is being detected.

SUMMARY OF THE INVENTION

In accordance with the present invention, there is provided a dithered image reconstruction system and method that compensates for inter-detector errors in a manner that does not adversely affect detection of small-amplitude images in the presence of a very bright large-amplitude background. Furthermore, the technique of the present invention does not substantially distort the received signal, and does not fail when the image characteristics have little spatial variation, such as when a large target area is being detected. Thus the present invention is thus able to accurately reconstruct large or small targets from imaging sensors in noisy environments.

Individual pixel measurements are taken from a two-dimensional array of light-sensitive detectors. An overlapping dither pattern is employed, so that the detectors move in a periodic fashion over some area of the image. Each individual detector therefore covers a number of image sections, and each image section is viewed by a number of individual detectors. Outputs generated by individual detectors are adjusted in an iterative fashion so that 1) all outputs for a particular detector are adjusted by the same amount; and 2) all adjusted outputs for a particular image section are sufficiently close to approach a solution representative of the actual signal output for that image section.

In another aspect of the present invention, condition 1) is relaxed, so that output adjustments for a particular detector are permitted to vary in a controlled manner by some predetermined amount.

In yet another aspect of the present invention, the techniques of the present invention are implemented using simultaneous solution on a parallel processor.

In yet another aspect of the present invention involving extended temporal detection of a target, output adjustments are stored and used as initial conditions for subsequent frames.

BRIEF DESCRIPTION OF THE DRAWINGS

FIGS. 2A and 2B show distortion in target signal induced by active offset compensation techniques of the prior art.

DETAILED DESCRIPTION OF THE PREFERRED EMBODIMENTS

The following description refers to an embodiment of the present invention directed toward digital sensing mechanisms. As will be recognized by those skilled in the art, the techniques of the present invention can also be applied to analog sensing mechanisms employing continuous sensors.

Figure 1:
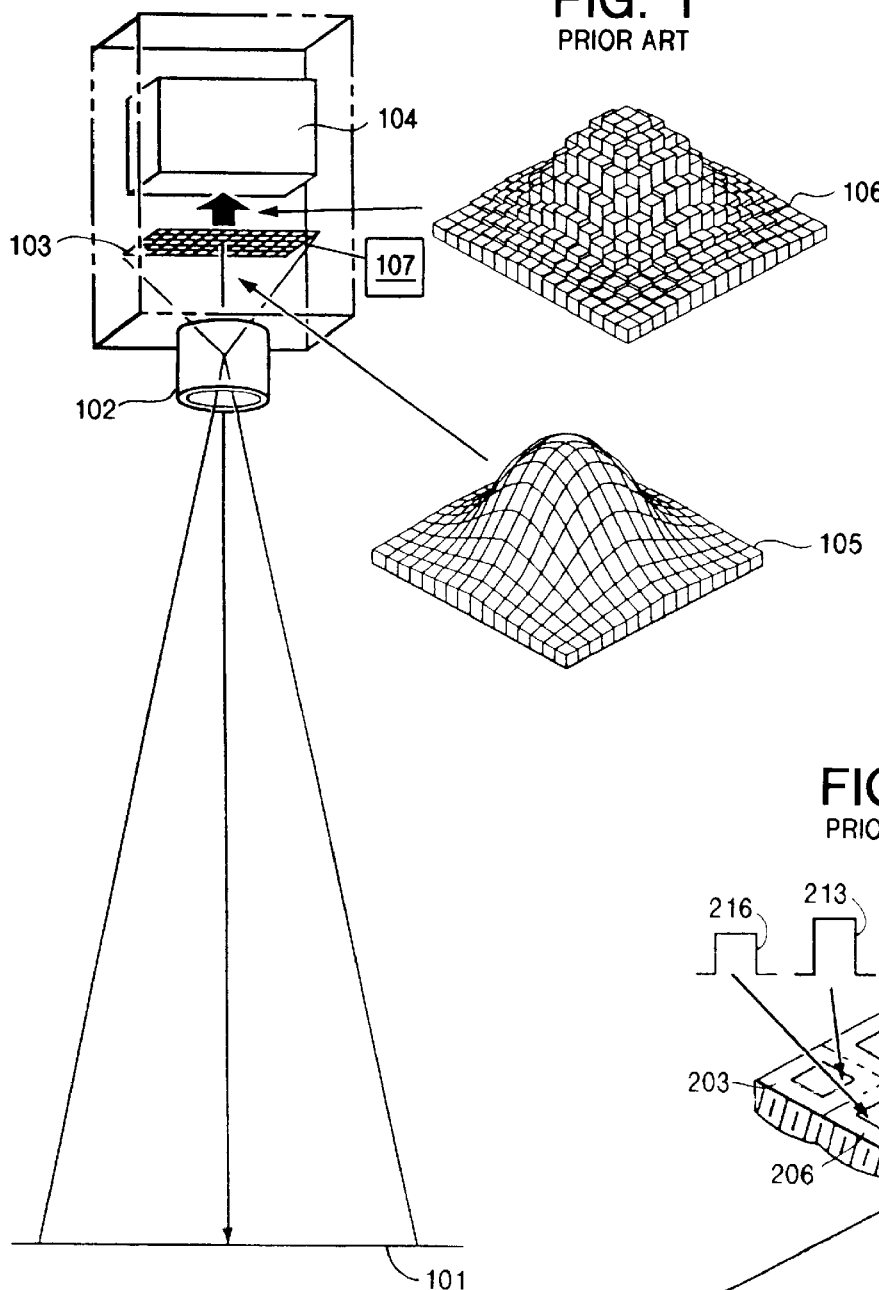
FIG. 1 is a diagram of a digital imaging system according to the prior art.

Referring now to FIG. 1, there is shown a diagram of a digital imaging system according to the prior art. Viewed scene 101 is viewed by the system using any type of electromagnetic radiation, such as for example, infrared, ultraviolet, visible light, ionized particle, x-ray, and the like. Focusing optics 102, which may include lenses, mirrors, filters, magnetic fields, and the like, focus an image of scene 101 onto discrete imaging sensor 103. Sensor 103, also known as a focal plane array or detector array, includes a number of discrete sensing elements, or detectors, arranged in a two-dimensional mesh pattern. In one embodiment, detectors are one or more of the following: 128×128 pixel InSb HgCdTe infrared focal plane array detectors supplied by Barbara Focalplane, Inc.; or 256×256 pixel HgCdTe infrared focal plane array detectors supplied by Rockwell Inc. Other examples of detector components include ultraviolet imagers, x-ray imagers, consumer camcorder sensor elements, and the like. In one embodiment, detector array controller 107 moves detector elements to implement a dither pattern. In another embodiment, controller 107 adjusts optics 102 to implement a dither pattern. Digital processing electronics 104 process the pattern sensed by sensor 103. Electronics 104 may be implemented as, for example, an application-specific integrated circuit (ASIC), microprocessor, parallel array, and the like. Thus, energy from scene 101 is focused by optics 102 onto sensor 103, which can be represented as shown in image 105 as a three-dimensional shape having "height" corresponding to the detected amplitude of the energy at particular points in the grid. The signal formed by the pattern of 105 is then discretized (or digitized) for subsequent digital processing. The discretized image can be represented as in 106, where each mesh element has an associated "height".

Figure 2:
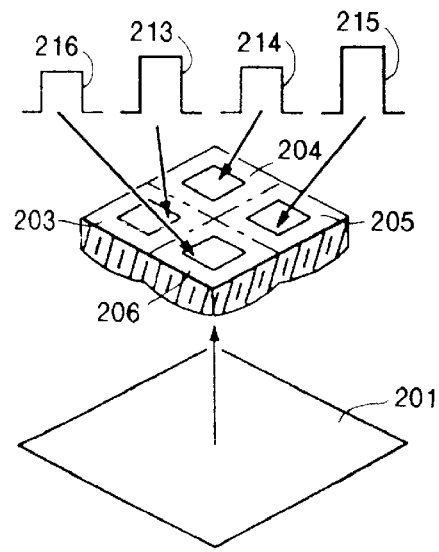
FIG. 2 shows signal outputs from four discrete detectors of an imaging sensor according to the prior art.

Referring now to FIG. 2, there is shown an example of signal outputs 213, 214, 215, 216 from four discrete detectors 203, 204, 205, 206 of imaging sensor 103. A section 201 of scene 101 is associated with detectors 203, 204, 205, 206. Outputs 213, 214, 215, 216 are generated using a transfer function of the input energy of section 201. Differences in signal magnitudes of outputs 213, 214, 215, 216 result from differences in detection characteristics, for example gain variations, among individual detectors 203, 204, 205, 206. Such variation is referred to as "inter-detector error." Calibration of elements 203, 204, 205, 206 can reduce inter-detector error somewhat, but some signal error often remains.

Figure 3:
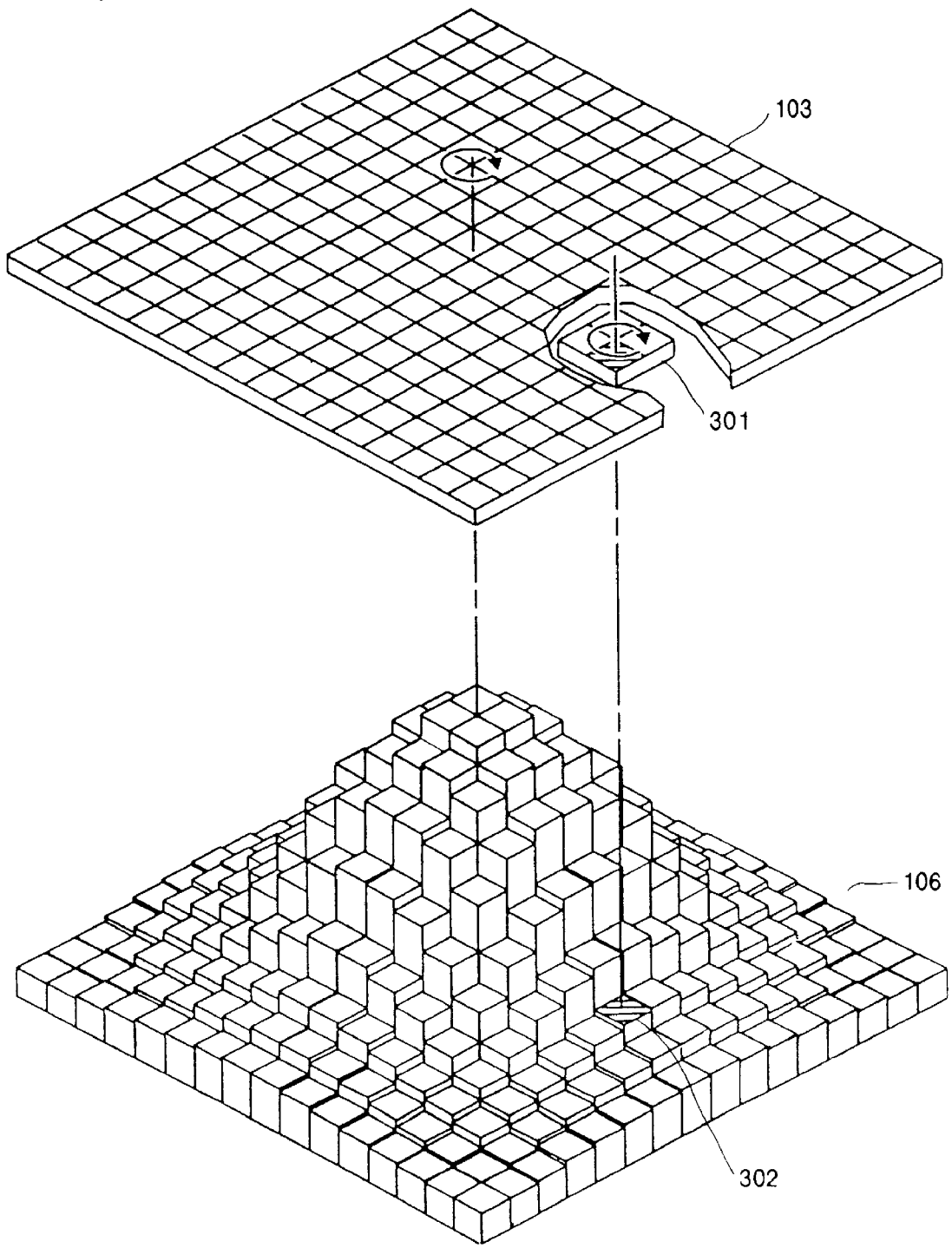
FIG. 3 shows a dithering method according to the prior art.

Referring now to FIG. 3, there is shown an example of a dithering method according to the prior art. Dithering reduces the above-described error in the sensed image by moving individual detectors of sensor 103 or adjusting optics 102 so that individual detectors successively target different sections of scene 101. Dithering is generally accomplished by performing such movement or adjustment in a fixed pattern. In the example of FIG. 3, a four-position circular dither pattern is shown. A group 301 of four detectors are shown as rotating among four positions, so that each detector is effectively shifted one position north, south, east, and west, in succession. Each detector thus views four sections of scene 101 rather than just one, and each section of scene 101 is viewed by four detectors of sensor 103. Thus, the error in discretized signal section 302 due to detector-specific distortions can be reduced by averaging the signal outputs of the four detectors.

Figure 4:
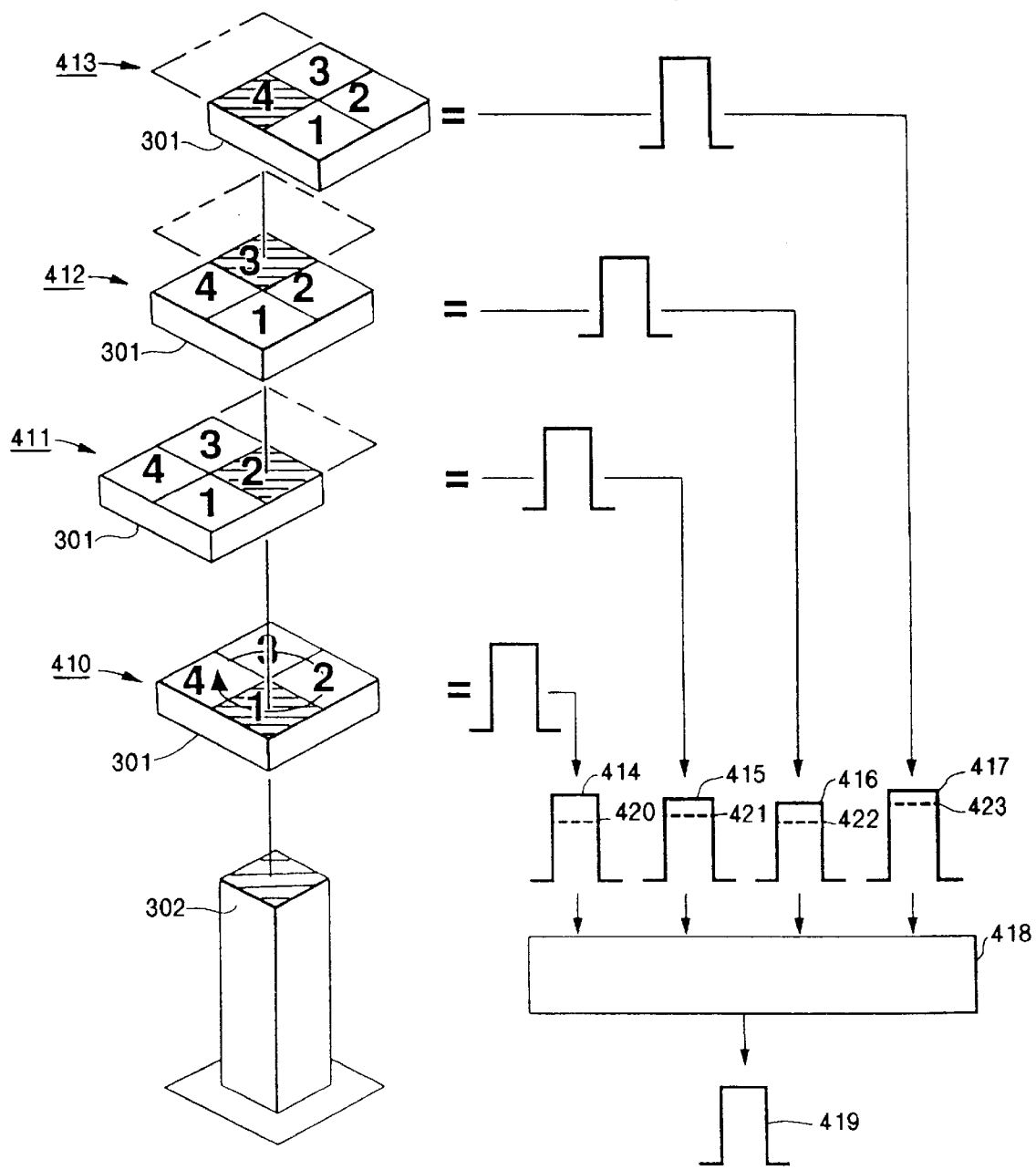
FIG. 4 is a detail of one region of a scene and four detectors in a four-position dither according to the prior art.

Referring now to FIG. 4, there is shown a detail of one section 302 of discretized signal 106 representing scene 101 and group 301 of four detectors in a four-position dither, according to the prior art. In position 410, detector 1 detects energy from section 302 and generates output 414 approximately representative of true incident energy 420, indicated as a dashed line. The error between true energy 420 and output 414 may be due to any combination of detector-specific and or detector-independent distortion or error factors as described above. In position 411, detector 2 detects energy from section 302 and generates output 415 approximately representative of true incident energy 421. Similarly, in position 412, detector 3 detects energy from section 302 and generates output 416 approximately representative of true incident energy 422, and in position 413, detector 4 detects energy from section 302 and generates output 417 approximately representative of true incident energy 423. Processor 418 combines readings 414, 415, 416, 417 to obtain a final output 419 representative of energy from section 302.

Although detector-specific error is reduced in final output 419 by the method of combining outputs of four detectors, it does not solve the problem of detection in high-amplitude background situations. Precision of averaged signal output 419 may be insufficient in such situations to resolve low-intensity targets. In particular, such high-level noise can exacerbate inter-detector error by forcing detectors to operate at high points on the gain curve, resulting in increased error. As discussed above, active offset compensation (AOC) is often employed to address this problem, as described by R. D. Frey, Jr., "Image Dithered Non-Uniformity Estimation and Correction", March 1995. A high-pass filter is applied to each individual detector output, in order to reduce low frequency and constant sections of detector temporal output. Thus, relatively high-level background radiation is filtered out, while spatial variations in the object space image result in temporal variations in the detector output, due to dithering. These variations are passed through the temporal high-pass filter. Thus, edge detection of target signals is facilitated, and the effect of background noise reduced.

However, AOC causes regions in the object space image having little spatial variation over the spatial extent of the dither sequence to be significantly reduced as they cause minimal temporal variation in the detector outputs processed through the high-pass filters. Referring now to FIGS. 2A and 2B, there is shown an example of distortion in a target signal induced by active offset compensation techniques. When target input 220 contains a target 222 occupying a large area having relatively flat image characteristics, as shown, output pattern 221 often fails to depict a significant central portion of the target. Since the area covered by target 222 has little spatial variation within dither sequences, minimal temporal variation is seen in detector output, and the high pass filter attenuates the signal. Thus, output pattern 221 forms a concave shape 223 emphasizing edges but attenuating the central portion of the target. In many applications, such an effect can lead to errors in identification of a target.

Figure 4A:
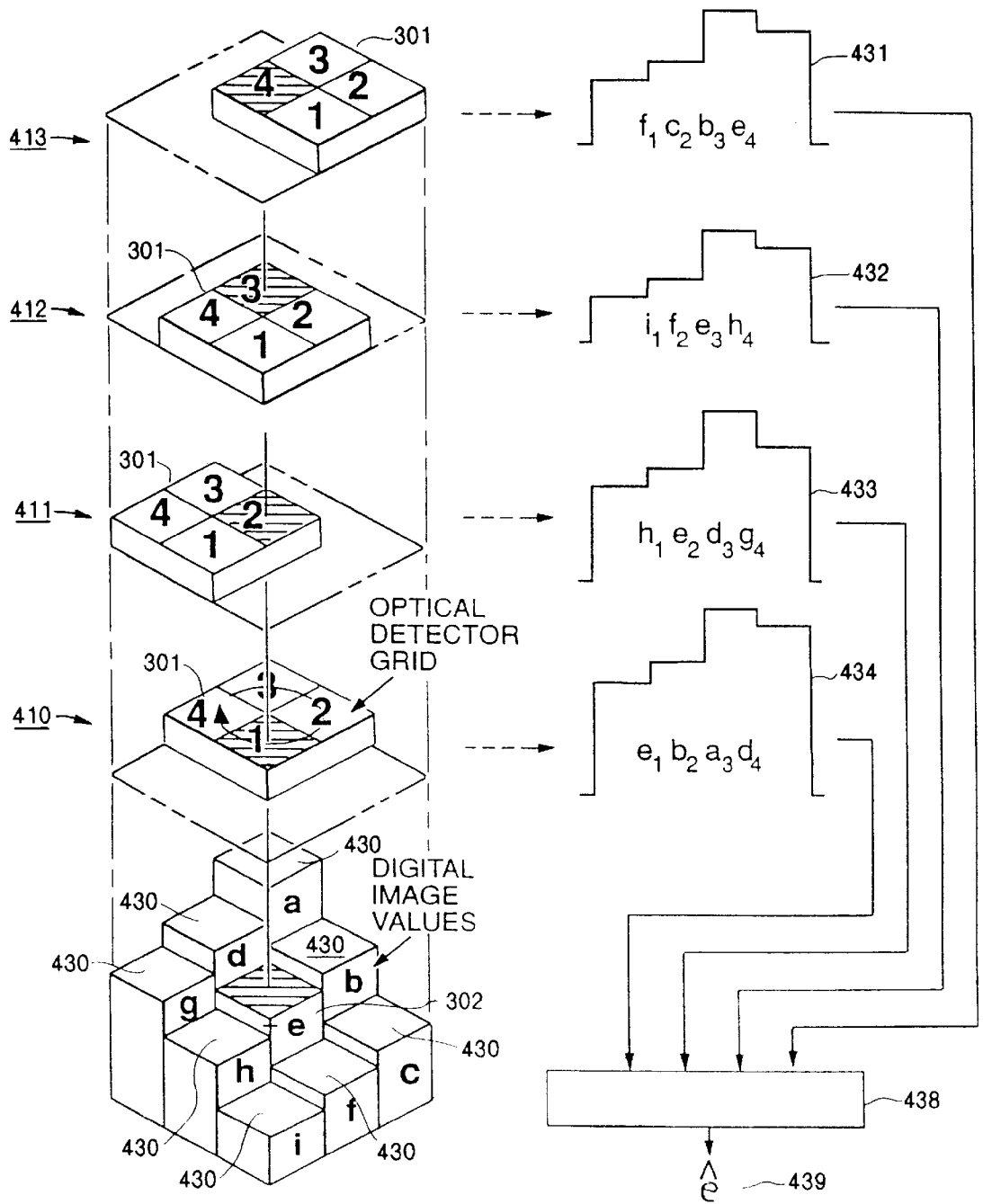
FIG. 4A shows a technique of combining four readings of a scene region to produce corrected output according to the present invention.

Referring now to FIG. 4A, there is shown an example of a technique of combining outputs 431, 432, 433, 434 at four dither positions 410, 411, 412, 413 to produce corrected output 439 according to one embodiment of the present invention. Section 302 (denoted as "e") and surrounding sections 430 (denoted as "a", "b", "c", "d", "f", "g", "h", and "i") of digitized signal 106 representing scene 101 are shown. At each dither position 410, 411, 412, 413, an output 434, 433, 432, 431 (respectively) is generated, consisting of four signal samples. Thus, output 434 generated at dither position 410 includes readings of sections 302e, 430b, 430a, and 430d. These readings are denoted as $e_1$, $b_2$, $a_3$, and $d_4$ respectively. Similarly, output 433 includes readings $h_1$, $e_2$, $d_3$, $g_4$; output 432 includes readings $i_1$, $f_2$, $e_3$, $h_4$; and output 431 includes readings $f_1$, $c_2$, $b_3$, $e_4$. Thus, each output 434, 433, 432, 431 includes a reading for section 302e. Processor 438 combines outputs 433, 433, 432, 431 to minimize detector-specific error and produce a corrected output 439 for section 302e. Since each output 434, 433, 432, 431 provides processor 438 with comparative values for four sections, processor 438 is better able to correct for detector-specific errors. Specifically, processor 438 performs the following two sets of comparisons in order to determine adjustment values to be used in generating output 439: 1) a comparison of all readings for a particular image section; and 2) a comparison of all readings for a particular detector. As will be described in more detail below, in one embodiment, processor 438 iteratively performs these two sets of comparisons while holding constant the adjustment values for all measurements of a particular detector in order to converge on a solution. In another embodiment, adjustment values are permitted to vary within a detector in a controlled manner.

Figure 6:
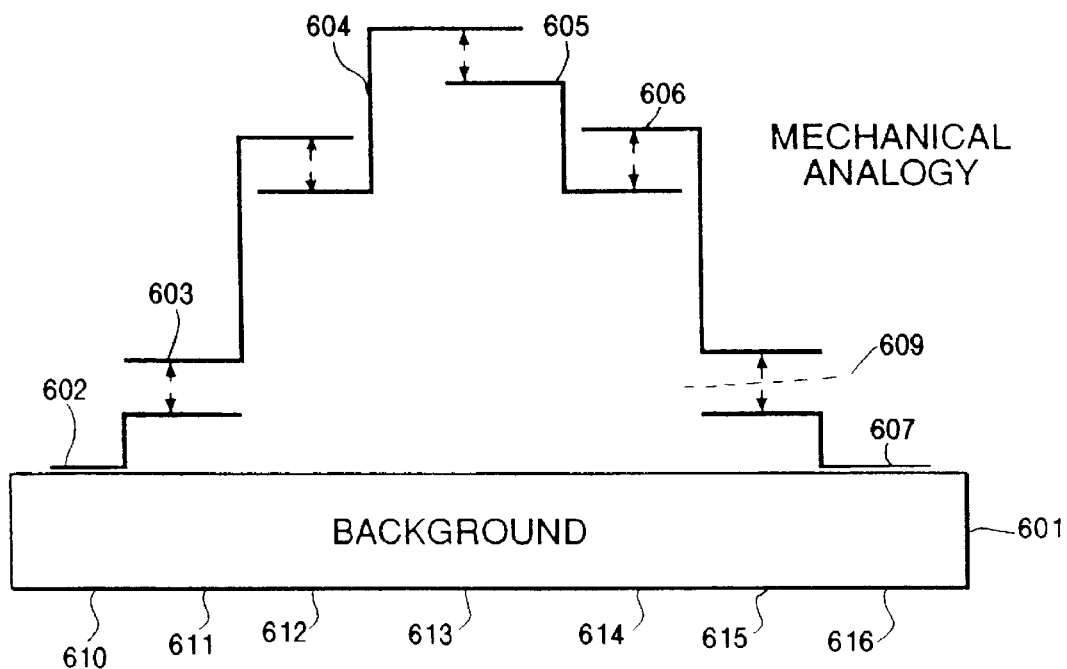
FIG. 6 is a conceptual diagram of a mechanical analogy of the image reconstruction technique of the present invention.

Referring now to FIG. 6, there is shown a conceptual diagram of a mechanical analogy of the technique of the present invention. For illustrative purposes, the diagram of FIG. 6 presents a one-dimensional representation of the mechanical analogy. Thus, a two-position dither pattern is described instead of the four-position pattern described above. Rigid shapes 602, 603, 604, 605, 606, 607 are each defined by two output levels of a sensor detector, the output levels including errors and noise. The vertical position of each segment of shape 602, 603, 604, 605, 606, 607 represents an output value, and the horizontal position represents a one-dimensional abstraction of the image 601 section 610, 611, 612, 613, 614, 615, 616 covered by the shape.

Each shape 602, 603, 604, 605, 606, 607 is shown to cover two image sections 610, 611, 612, 613, 614, 615, 616 and therefore has two output levels. Each image section 611, 612, 613, 614, 615 is covered by two shapes. For each image section 611, 612, 613, 614, 615 there is an actual value representing the true signal level of that image section. The two shapes covering each image section describe a pair of "perceived" output levels which approximate the actual value. Thus, the actual value for each section generally lies between two perceived output levels described by the two shapes that overlap that section. For example, actual value 609 for section 615 lies between a high value described by shape 606 and a low value described by shape 607.

In the mechanical analogy of FIG. 6, shapes 602, 603, 604, 605, 606, 607 are allowed to move vertically, with the constraint that the shapes remain rigid, so that both perceived output levels are adjusted by the same amount for a given shape. Furthermore, each shape is attached by an imaginary spring (not shown), represented by arrows in the Figure, to other shapes overlapping the same section. For example, shapes 606 and 607 are attached by an imaginary spring in section 615. Thus, shapes will tend to be pulled by other, adjacent and overlapping shapes. Shape 606 tends to pull shape 607 in an upward direction, while shape 607 tends to pull shape 606 in a downward direction. However, each shape is also subject to pulls from other overlapping shapes. Since each shape is rigid and moves as a unit, the opposing pulls tend to move the shapes toward the actual values for the various sections. When the apparatus is in its rest position, the energy in the springs is at a minimum, and the average of the values represented by the overlapping shapes covering each section very closely approximates the actual signal magnitude at that position. The mechanical analogy thus illustrates how the present invention performs an error minimization, corresponding to the minimization of the spring tension energy, by an iterative relaxation process.

Therefore, the present invention reduces signal error by driving the output value toward the average of the multiple dithered readings subject to the constraint that the adjustment is the same for each sensor detector. Thus, detector-specific error is reduced. In one embodiment, in order to reduce other, detector-independent errors, the constraint is relaxed so that some variance in the adjustment within a sensor detector is permitted. The weighting between inter-detector and intra-detector sampling may be adjusted as needed. Sampling and temporal effects may also be employed to further reduce error.

Figure 5:
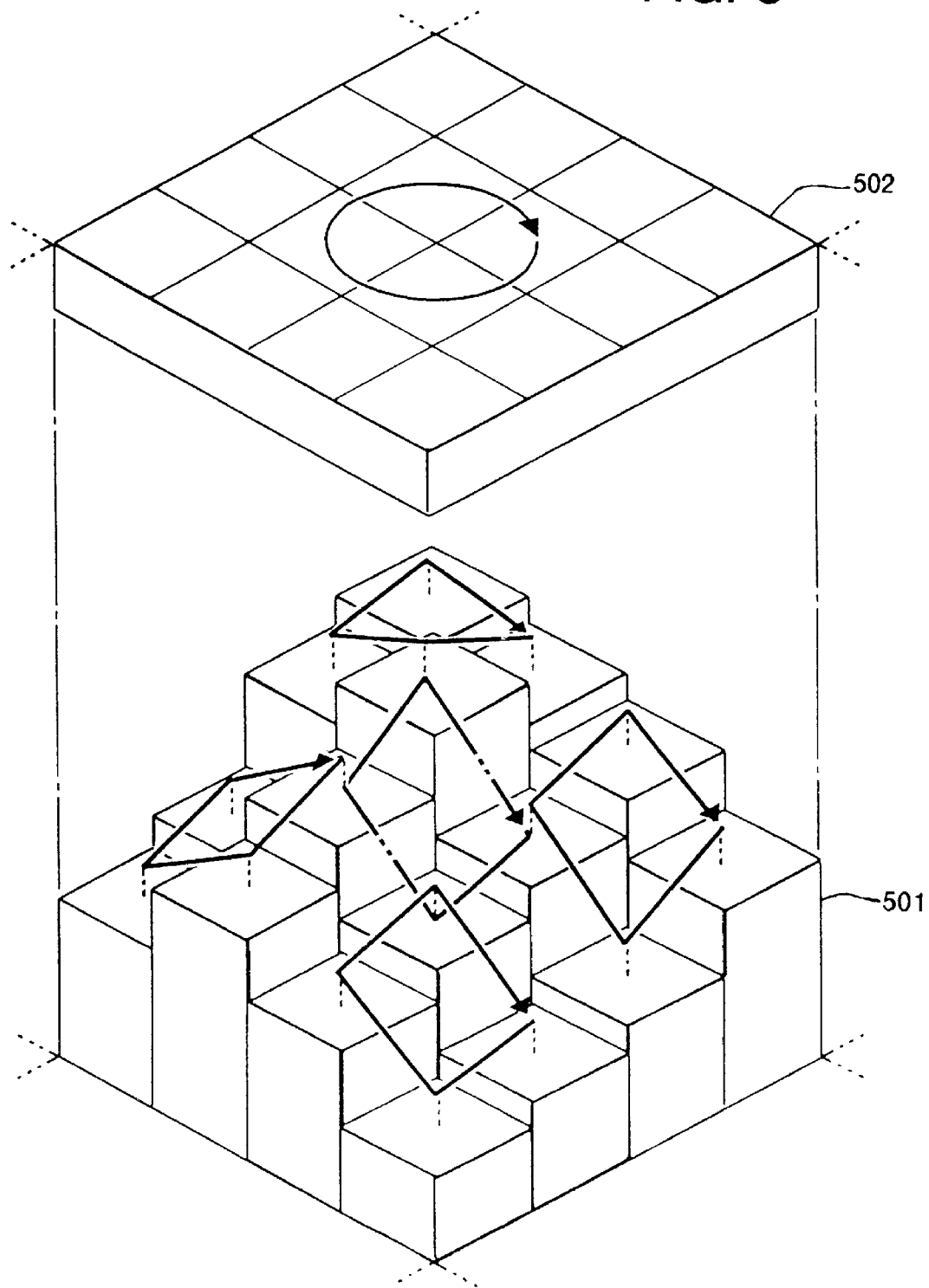
FIGS. 5 and 5A show a method of simultaneous application of the technique of the present invention to all regions in the scene and all detectors in the imaging sensor.
Figure 5A:
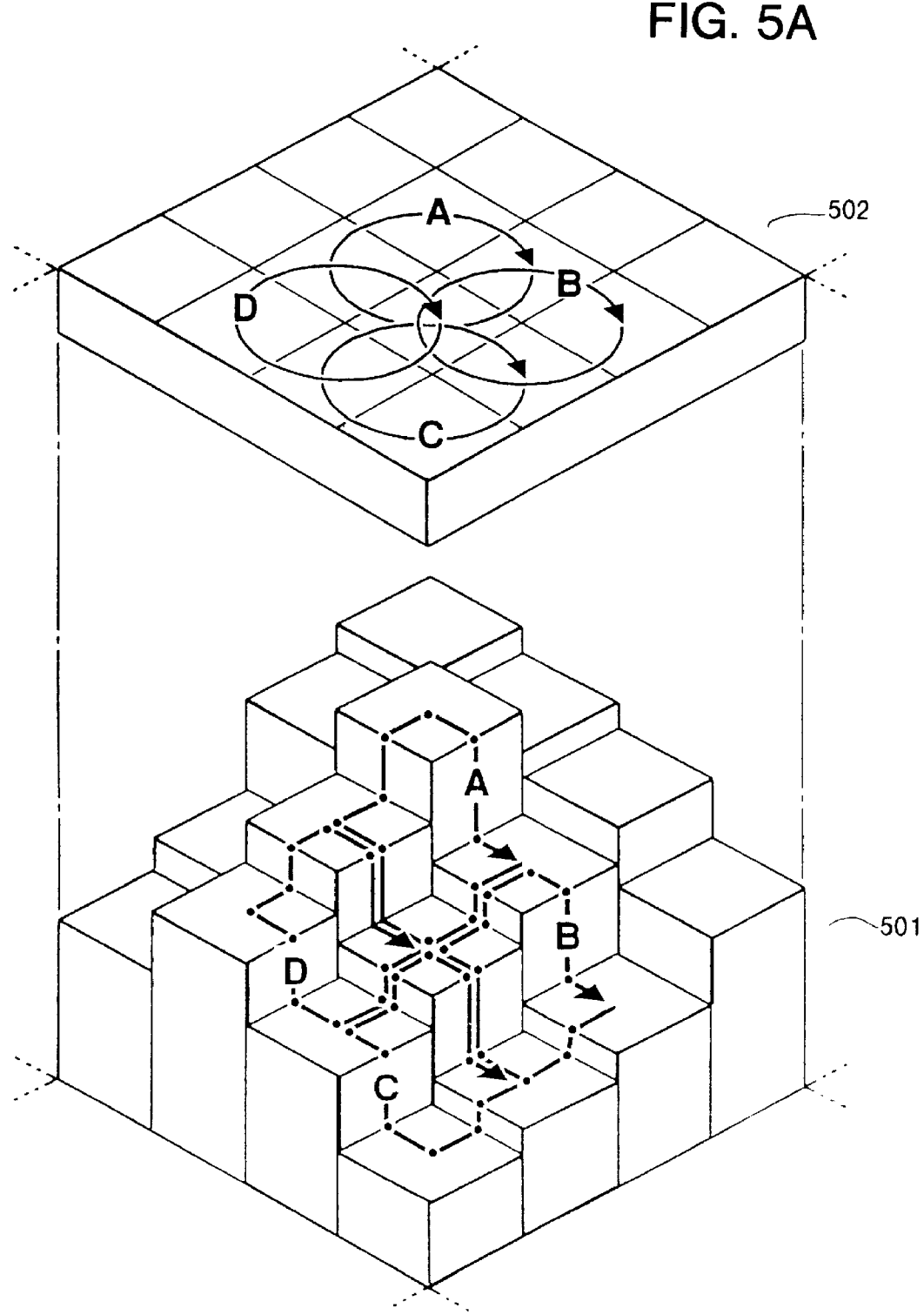
Figure 5B:
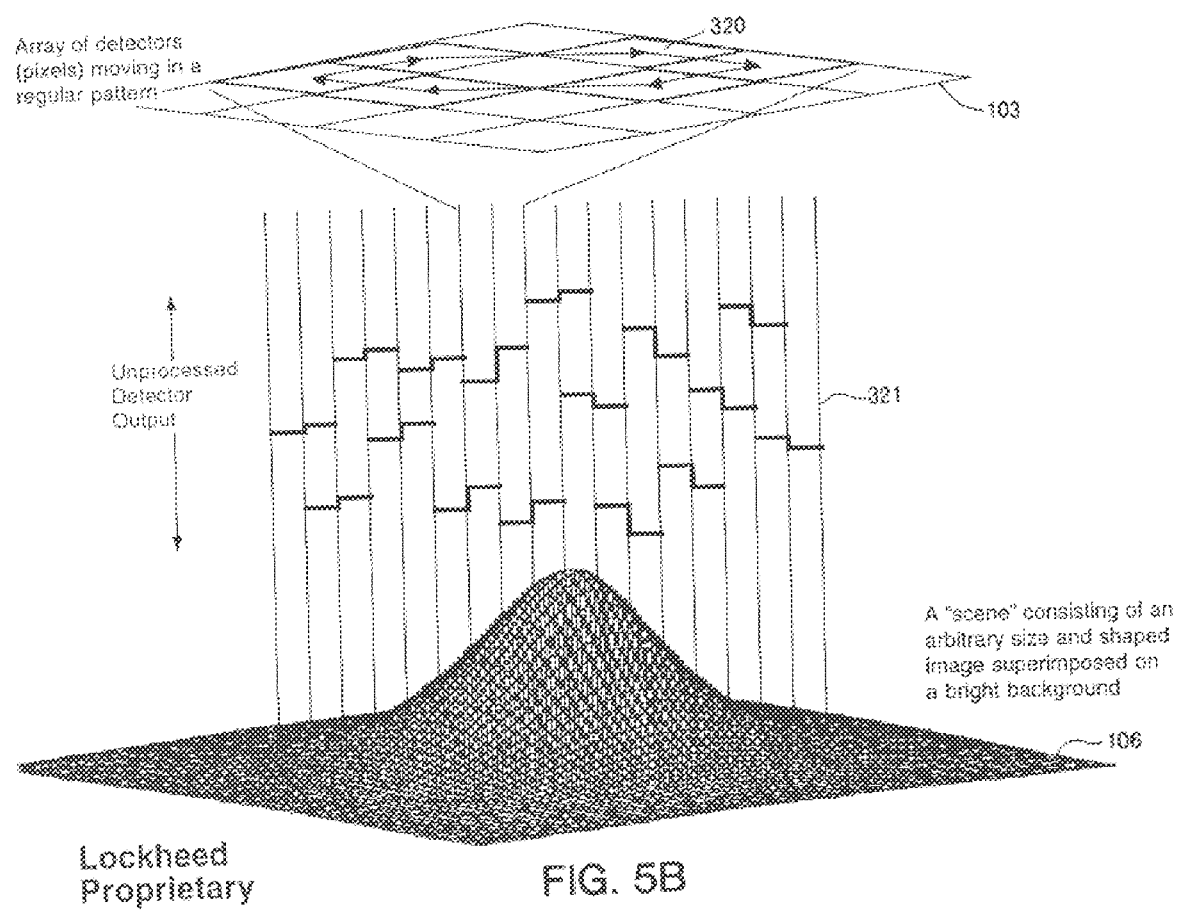
FIG. 5B is a diagram of focal plane sampling using a dithering technique with overlapping detectors.

Referring now to FIG. 5B, there is shown a diagram of focal plane sampling using a dithering technique, applying the technique presented in the analogy of FIG. 6. A portion of sensor 103 is shown including detector 320 which moves in an elliptical fashion over signal 106 (representing scene 101). Signal 106 is represented in the Figure as a three-dimensional graph wherein height represents amplitude. Thus, the amplitude distribution of signal 106 may represent any arbitrary size and shape of an image. Output 321 from a one-dimensional cross-section of detectors is shown for illustrative purposes. Each segment of output 321 represents the output from one of detectors in sensor 103 as it moves across various sections of signal 106.

As can been seen from the pattern of output 321, each detector provides output for two image sections, and each image section is covered by two detectors. The method of the present invention corrects for inter-detector variation by taking into account the differences between detectors covering the same image section, as well as differences between image sections covered by the same detector.

Figure 10:
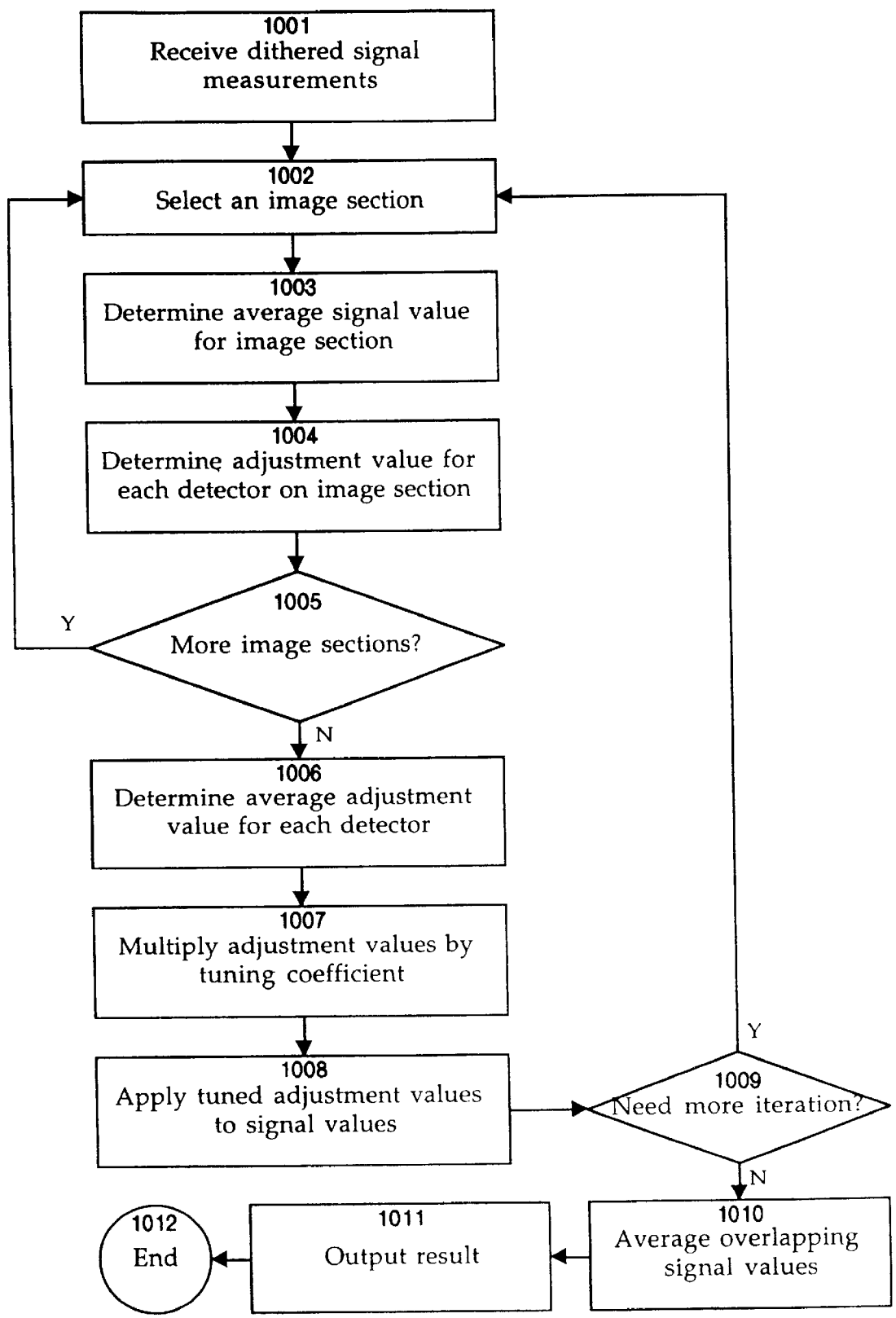
FIG. 10 is a flowchart of the method of the present invention.

Referring now to FIG. 10, there is shown a flowchart of the method of the present invention. For illustrative purposes, the method of FIG. 10 will be described with reference to the simplified example shown in FIG. 4A. Processor 438 receives 1001 dithered signal measurements for all sections 430, 302 of the image. Since the dither pattern is overlapping, several measurements are provided for each section 430, 302. In the simplified example of FIG. 10, four measurements are provided for each section 430, 302.

Processor 438 selects 1002 an image section 302e to be processed. In one embodiment of the present invention, the method of FIG. 10 is implemented on a parallel processor, so that multiple image sections and detector outputs can be processed simultaneously for improved performance. In another embodiment, processor 438 traverses the image in order to process each section successively.

Processor 438 performs 1003 and 1004 for each image section as follows, either in sequence or in parallel. Processor 438 determines 1003 an average signal measurement for selected section 302e by combining the values measured by all detectors for that section 302e. Mathematically, processor 438 determines:

$$A_j=(\Sigma X_i)/n \quad \text{(Eq. 1)}$$

where:
A represents the average signal measurement for section j;
$X_i$ represents the measured value of detector i over the section; and
n represents the number of positions in the dither pattern.
In the example of FIG. 4A, measured values for section 302e are represented as $e_1$, $e_2$, $e_3$, and $e_4$.

Processor 438 determines an adjustment value for each detector on the selected image section by determining the difference between the detector measurement and the average signal measurement for the selected image section. Thus, for each detector i over the section, processor 438 determines:

$$d_i=A_j-X_i \quad \text{(Eq. 2)}$$

where:
$d_i$ represents the adjustment value for detector i over the section.

If image sections are being processed sequentially, processor 438 determines 1005 whether any more image sections need to be processed, and repeats 1002–1004 for each image section.

Therefore, for each detector i, a set of adjustment values $d_i$ is developed, one such value for each image section covered by the detector. Processor 438 determines an average adjustment value for each detector i. Average adjustment value $D_i$ for detector i can be obtained by:

$$D_i=(\Sigma d_j)/n \quad \text{(Eq. 3)}$$

where:
$d_j$ represents the adjustment value for detector i over section j.

Thus, Eq. 3 determines an average adjustment value for a single detector over all the image sections covered by that detector. In one embodiment, signal values for the detector are adjusted by adding $D_i$ to the measured values generated by detector i. However, it has been found that such an adjustment may lead to an oscillating solution. Therefore, in one embodiment of the present invention, processor 438 multiplies adjustment value $D_i$ by a predetermined tuning coefficient in order to eliminate the oscillation effect and expedite converges to a solution. Thus:

$$S_i'=S_i+aD_i \quad \text{(Eq. 4)}$$

where:
$S_i'$ represents the adjusted signal value for detector i at a particular image section;
$S_i$ represents the raw signal value for detector i at a particular image section;
a represents the tuning coefficient; and
$D_i$ represents the adjustment value for detector i.

Tuning coefficient a may be any constant, or may be a function of other parameters of the system. In one embodiment, a constant value of 0.5 is employed as tuning coefficient a.

Eq. 4 provides a single adjustment factor ($aD_i$) for all signal values for a particular detector. In one embodiment, an additional adjustment factor is provided to permit some difference in adjustment for individual signal values within a detector. Thus, compensation for intra-detector error is facilitated. This is analogous to reducing the rigidity of the shapes described above in connection with FIG. 6. Thus, in lieu of Equation 4, processor 438 employs:

$$S_i'=S_i+aD_i+bd_j \quad \text{(Eq. 4)}$$

where:
b represents a second tuning coefficient that reflects the degree to which the adjustment factor is permitted to vary within a detector. Tuning coefficient b may be any constant, or may be a function of other parameters of the system. In one embodiment, a constant value of 0.02 is employed as tuning coefficient b.

Once adjusted signal values have been determined for all detectors over all sections of the image, processor 438 determines 1009 whether additional iterations are required. In one embodiment, a fixed number of iterations are performed. In an alternative embodiment, processor 438 determines the variance among adjusted signal values for overlapping detectors, and continues iteration until the variance reaches a predetermined value. Other mechanisms may also be employed for determining 1009 whether more iteration is needed.

If processor 438 determines 1009 that another iteration is needed, it returns to 1002, using the adjusted signal values as inputs for 1002 through 1009. If processor 438 determines that no further iteration is needed, it determines a final signal value for each image section by averaging 1010 the overlapping adjusted signal values for each image section. This final signal value is output 1011 and the process ends 1012.

In one embodiment of the present invention, a sequence of images 101 is processed using the above-described method, for example when performing image recognition over a period of time. Successive images 101 in the sequence may represent the same scene as it changes over time. In such situations, the image characteristics of the scene remain relatively constant from image to image in the sequence. In one embodiment of the present invention, the method of FIG. 10 is applied to successive frames using adjustment values from a previous frame as an initial adjustment value. When image conditions are relatively constant or even similar from one frame to the next, this technique may accelerate the process of converging toward a solution.

Referring now to FIGS. 5 and 5A, there is shown a method of simultaneous application of the technique of the present invention to all sections in scene 101 and all detectors in the imaging sensor. For illustrative purposes, a portion 502 of imaging sensor and a portion 501 of digitized signal representing scene 101 are shown. For example, FIG. 5A shows four detectors 502A, 502B, 502C, 502D of sensor portion 502, each tracing a four-position circular pattern corresponding to four paths in digitized signal portion 501, indicated by corresponding letters on portion 501. In one embodiment, the entire sensor 103 is mechanically or optically dithered in this manner, so that each detector traces a path over different sections of scene 101, one such section for each dither position.

Figure 7:
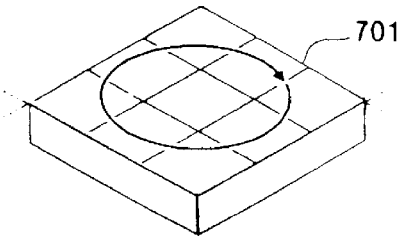
FIG. 7 shows an alternative eight-position circular dither pattern.
Figure 8:
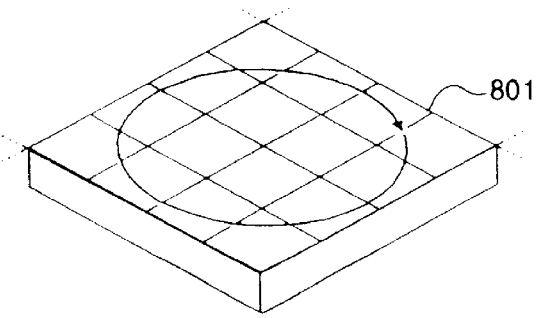
FIG. 8 shows an alternative twelve-position circular dither pattern.

The present invention may employ any dither pattern having any number of positions arranged in any shape. Referring now to FIG. 7, there is shown an eight-position dither pattern 701. Referring now to FIG. 8, there is shown a twelve-position dither pattern 801.

Figure 9A:
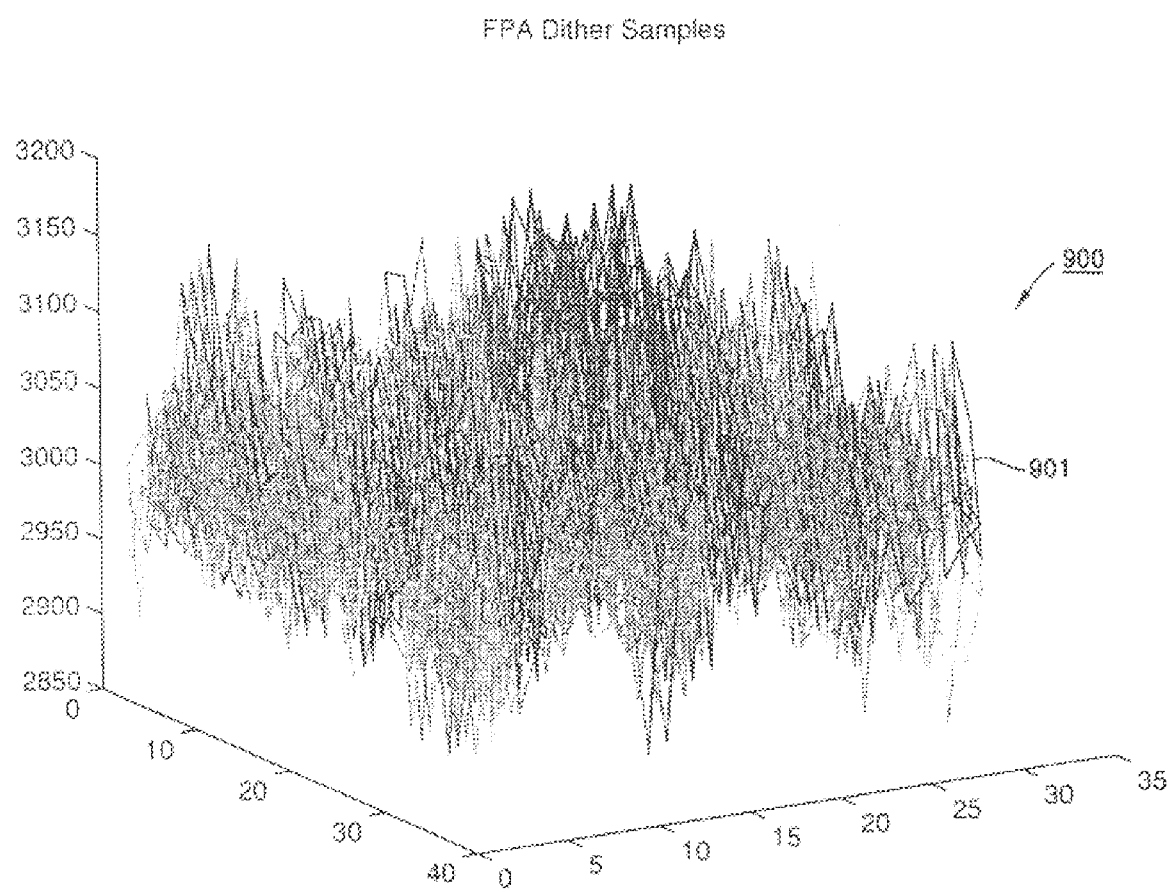
FIGS. 9A, 9B, and 9C are diagrams of an example of application of the techniques of the present invention as applied to a signal having high levels of background noise.
Figure 9B:
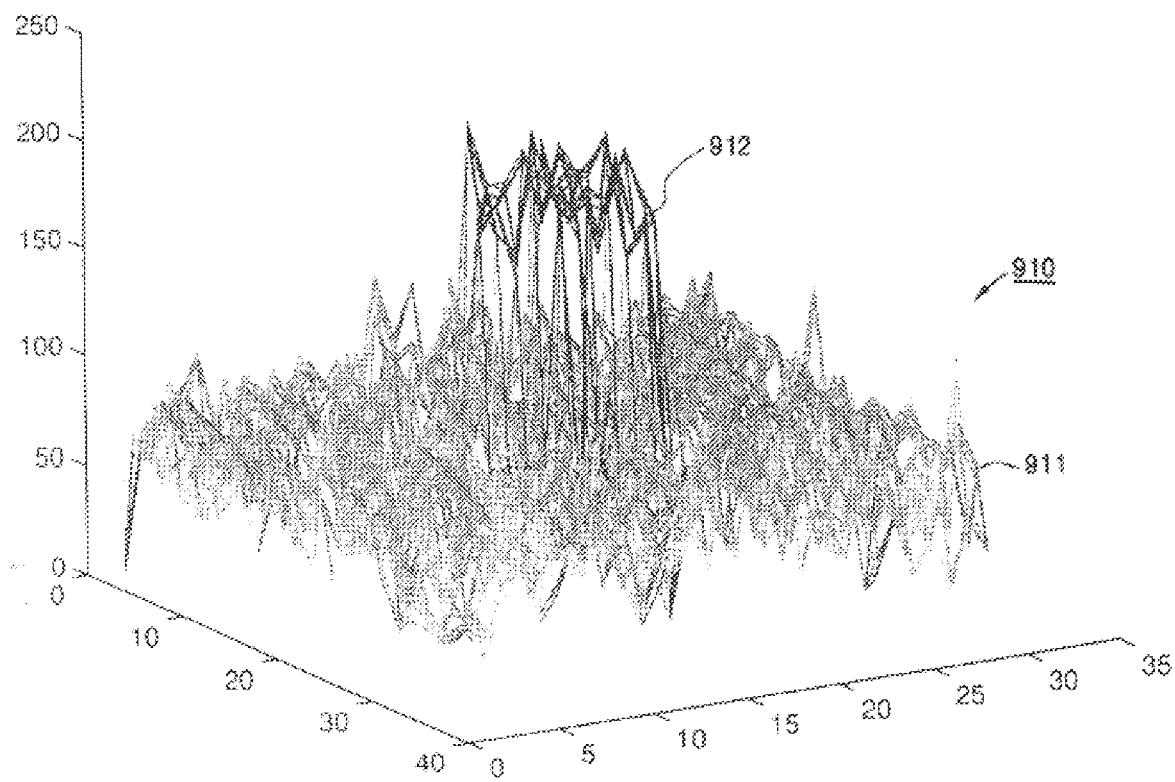
Figure 9C:
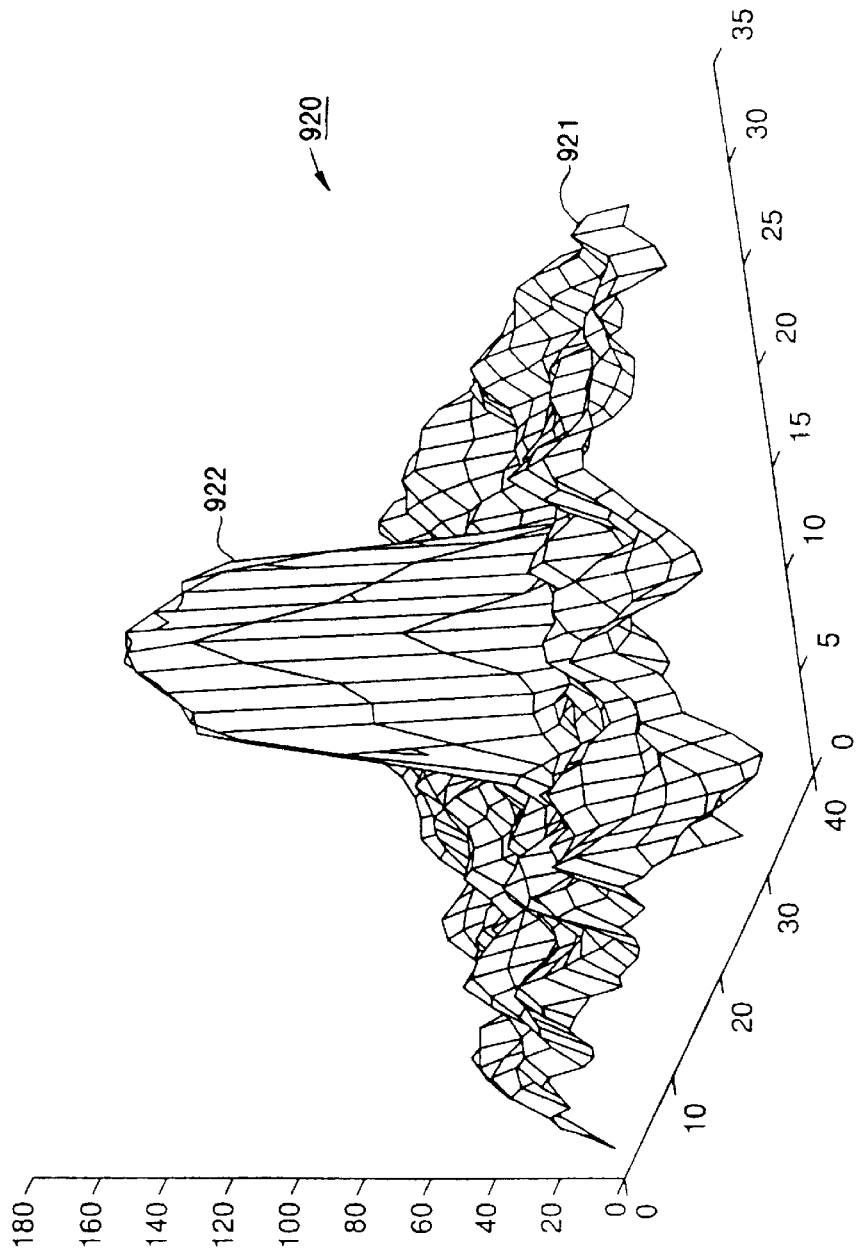

Referring now to FIGS. 9A, 9B, and 9C, there is shown an example of application of the techniques of the present invention as applied to a signal having high levels of background noise. FIG. 9A shows a signal graph 900 in which intensity is plotted along the z-axis with respect to two-dimensional position on the x- and y-axes. Signal 901 contains a high level of background noise, making target recognition and acquisition difficult using conventional methods. FIG. 9B shows signal graph 910 representing the signal of FIG. 9A after several iterations of the method of the present invention. Target signal 912 can now be distinguished from background signal 911. FIG. 9C shows signal graph 920 representing the signal of FIG. 9A after completion of the method of the present invention. Target signal 922 is now clearly distinguishable from background signal 921.

From the above description, it will be apparent that the invention disclosed herein provides a novel and advantageous system and method of reconstructing dithered images. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for reconstructing a dithered image, comprising:

(a) applying a detector array to an image, the image comprising a plurality of image sections, the detector array comprising a plurality of detectors, each detector having a plurality of dither positions, each dither position associating the detector with one of the image sections;

(b) adjusting each detector to a first dither position;

(c) for each detector, obtaining a first signal corresponding to an associated image section for the first dither position;

(d) adjusting each detector to a subsequent dither position;

(e) for each detector, obtaining a subsequent signal corresponding to an associated image section for the subsequent dither position;

(f) for each image section, determining an estimated output signal by comparing the signals obtained in steps (c) and (e) corresponding to the image section and further comparing the signals obtained in steps (c) and (e) for each detector having a dither position associating the detector with the image section; and (g) generating an output comprising the estimated output signals for the image sections.

2. The method of claim 1, wherein a first dither position of a first one of the detectors corresponds to a subsequent dither position of a second one of the detectors.

3. The method of claim 1, further comprising:

(e.1) repeating steps (d) and (e) until each detector has been positioned in each of the dither positions for the detector.

4. The method of claim 1, wherein step (f) comprises:

(f.1) for each detector, determining an adjustment value for adjusting all obtained signals for the detector; and (f.2) applying the determined adjustment value to all obtained signals for the detector.

5. The method of claim 1, wherein step (f) comprises:

(f.1) for each image section:

(f.1.1) determining an average signal value; and (f.1.2) for each detector associated with the image section, determining an adjustment value for the image section;

(f.2) for each detector, performing the steps of:

(f.2.1) determining an average of the adjustment values determined in step (f.1.2); and (f.2.2) for each image section associated with the detector, determining an adjusted signal by applying the average adjustment value to the obtained signal for the image section; and (f.3) for each image section, determining an estimated output signal by averaging the adjusted signals for each detector at the dither position corresponding to the image section.

6. The method of claim 5, further comprising:

(f.3.1) selectively repeating steps (f.1) through (f.3) until a predetermined condition is reached.

7. The method of claim 5, further comprising:
(f.3.1) for each image section, comparing the adjusted signals for each detector at the dither position corresponding to the image section; and
(f.3.2) responsive to the comparison of step (f.3.1) indicating that the adjusted signals differ by at least a predetermined threshold amount, repeating steps (f.1) through (f.3.1).

8. The method of claim 5, wherein step (f.2.2) comprises:
(f.2.2.1) multiplying the average of the adjustment values by a tuning coefficient to obtain a tuned average adjustment value; and
(f.2.2.2) determining an adjusted signal for each image section associated with the detector by applying the tuned average adjustment value to the obtained signal for the image section.

9. The method of claim 5, further comprising:
(h) applying the detector array to a second image;
(i) adjusting each detector to the first dither position;
(j) for each detector, obtaining a first signal corresponding to the associated image section for the first dither position;
(k) adjusting each detector to a subsequent dither position;
(l) for each detector, obtaining a subsequent signal corresponding to the associated image section for the subsequent dither position;
(m) adjusting the signals obtained in steps (j) and (l) by the average adjustment value determined in step (f.2.1); and
(n) repeating steps (f.1) through (f.3) for the second image.

10. The method of claim 1, wherein step (f) comprises:
(f.1) for each detector:
  (f.1.1) obtaining a set of adjustment values, each adjustment value corresponding to one of the image sections;
  (f.1.2) determining an average adjustment value from the set of adjustment values; and
  (f.1.3) applying the average adjustment value to output signals of the detector to obtain adjusted output signals;
(f.2) selectively repeating step (f.1) until a predetermined condition is reached; and
(f.3) for each image section, determining an average adjusted output signal from the adjusted output signals.

11. The method of claim 10, wherein step (f.1.2) further comprises:
(f.1.2.1) multiplying the average adjustment value by a tuning coefficient.

12. The method of claim 11, further comprising:
(f.1.4) applying an intra-detector adjustment factor to each adjusted output signal;
wherein the intra-detector adjustment factor comprises a tuned adjustment value for the adjusted output signal.

13. The method of claim 10,
wherein step (e) further comprises (e.1) for each image section, determining an average signal measurement;
and wherein step (f.1.1) comprises, for each image section covered by the detector, determining a difference between the average signal measurement and the detector output signal.

14. A system for reconstructing a dithered image comprising:
a detector array, the detector array adapted to receive an image, the image comprising a plurality of image sections, the detector array comprising a plurality of detectors, each detector having a plurality of dither positions, each dither position associating the detector with one of the image sections, each detector for obtaining a first signal corresponding to an associated image section for a first dither position and a subsequent signal corresponding to an associated image section for a subsequent dither position;
a detector array controller coupled to the detector array, for adjusting each detector to a first dither position and to at least one subsequent dither position;
a signal processor coupled to the detector array, for determining for each image section an estimated output signal by comparing the obtained signals corresponding to the image section and further comparing the obtained signals for each detector with other obtained signals for the detector; and
an output device coupled to the signal processor for generating an output comprising the estimated output signals of the signal processor.

15. The system of claim 14, wherein a first dither position of a first one of the detectors corresponds to a subsequent dither position of a second one of the detectors.

16. The system of claim 14, wherein the signal processor determines, for each detector, an adjustment value for adjusting all obtained signals for the detector, and applies the determined adjustment value to all obtained signals for the detector.

17. The system of claim 14, wherein the signal processor comprises:
a signal averaging module for determining an average signal value for each image section;
an adjustment value determining module coupled to the signal averaging module for determining an adjustment value for each image section for each detector associated with the image section;
an adjustment value averaging module coupled to the adjustment value determining module for determining an average of the adjustment values for each detector;
an adjusted signal generator coupled to the adjustment value averaging module for determining for each detector, a plurality of adjusted signals, each adjusted signal corresponding to an image section, by applying the average adjustment value to the obtained signal for the image section; and
an estimated output signal generator coupled to the adjusted signal generator, for determining for each image section an estimated output signal by averaging the adjusted signals for each detector at the dither position corresponding to the image section.

18. The system of claim 17, further comprising:
an adjustment value tuner coupled to the adjustment value averaging module, for multiplying the average of the adjustment values by a tuning coefficient to obtain a tuned average adjustment value;
and wherein the adjusted signal generator applies the tuned average adjustment value to the obtained signal for the image section.

* * * * *